(12) United States Patent
Robbins, III

(10) Patent No.: US 9,119,491 B2
(45) Date of Patent: Sep. 1, 2015

(54) CUP HOLDER WITH MORE AND LESS FLEXIBLE PORTIONS AND RECESSED MOVABLE HANDLE

(71) Applicant: Edward S. Robbins, III, Muscle Shoals, AL (US)

(72) Inventor: Edward S. Robbins, III, Muscle Shoals, AL (US)

(*) Notice: Subject to any disclaimer, the term of this patent is extended or adjusted under 35 U.S.C. 154(b) by 0 days.

(21) Appl. No.: 14/481,890

(22) Filed: Sep. 9, 2014

(65) Prior Publication Data

US 2015/0069075 A1 Mar. 12, 2015

Related U.S. Application Data

(60) Provisional application No. 61/876,890, filed on Sep. 12, 2013.

(51) Int. Cl.
| | |
|---|---|
| A47G 23/02 | (2006.01) |
| B65D 8/00 | (2006.01) |
| B65D 25/28 | (2006.01) |
| B29C 65/78 | (2006.01) |
| B29C 65/00 | (2006.01) |

(52) U.S. Cl.
CPC ......... *A47G 23/0216* (2013.01); *B29C 65/7832* (2013.01); *B29C 66/61* (2013.01); *B65D 11/02* (2013.01); *B65D 25/2844* (2013.01); *B65D 25/2861* (2013.01); *B65D 2525/285* (2013.01); *B65D 2525/288* (2013.01)

(58) Field of Classification Search
CPC .............. A47G 23/0216; A47G 23/02; A47G 2023/0283; A47G 2023/0291; B65D 81/3876; B65D 81/3886; B65D 11/02; B65D 2525/285; B65D 2525/286; B65D 2525/288; B65D 25/2838; B65D 25/2844; B65D 25/285; B65D 25/2861; B65D 25/2864; B65D 25/2852; B60N 3/108; B60N 3/105; Y10T 220/903; B29C 65/7832; B29C 66/61
USPC ......... 220/615–618, 611, 680, 682, 684, 691, 220/678
See application file for complete search history.

(56) References Cited

U.S. PATENT DOCUMENTS

| | | |
|---|---|---|
| 2,005,528 A | 6/1935 | Berchule |
| 2,009,192 A | 7/1935 | Freysinger |
| 2,373,917 A | 10/1942 | Ross |
| 3,025,997 A | 3/1962 | Matusky et al. |
| 3,044,659 A | 7/1962 | Tupper |
| 3,073,493 A | 1/1963 | Pfaffenberger |
| 3,104,010 A | 9/1963 | Pence |

(Continued)

FOREIGN PATENT DOCUMENTS

WO WO99/28200 10/1999

*Primary Examiner* — Anthony Stashick
*Assistant Examiner* — Mollie Llewellyn
(74) *Attorney, Agent, or Firm* — Brinks Gilson & Lione

(57) ABSTRACT

A cup holder sidewall includes a recess adapted to receive at least part of a handle having upper and lower socket engaging portions received in sockets in upper and lower flanges defining the recesses. The socket engaging portions permit the handle to be displaced from the sidewall recesses to a position projecting outward from the sidewall to permit the handle to be grasped in one hand. The sidewall includes at least one flexible segment extending through the sidewall from the inner surface to the outer surface, which may also extend from the upper margin to the lower margin. Each flexible segment renders the sidewall sufficiently flexible to allow the sidewall to adjust to receive cups of varying sizes and shapes.

20 Claims, 8 Drawing Sheets

(56) References Cited

U.S. PATENT DOCUMENTS

| | | |
|---|---|---|
| 3,419,196 A | 12/1968 | Moore |
| 3,443,715 A | 5/1969 | Edwards |
| 3,473,682 A | 10/1969 | Studen |
| 3,491,913 A | 1/1970 | Giraudet et al. |
| 3,581,930 A | 6/1971 | Gunnink |
| 3,734,336 A | 5/1973 | Rankow et al. |
| 4,715,633 A | 12/1987 | Brink et al. |
| 4,915,241 A | 4/1990 | Morimura et al. |
| 4,923,082 A | 5/1990 | Bird |
| 5,002,193 A | 3/1991 | Touzani |
| 5,089,208 A | 2/1992 | Nakamura et al. |
| D347,553 S | 6/1994 | Schneider |
| 5,385,260 A | 1/1995 | Gatcomb |
| 5,425,497 A | 6/1995 | Sorensen |
| 5,454,484 A | 10/1995 | Chelossi |
| D364,538 S | 11/1995 | Hughes |
| 5,469,983 A | 11/1995 | Yawata |
| 5,480,043 A | 1/1996 | Wingo |
| 5,547,124 A | 8/1996 | Mueller |
| 5,647,624 A | 7/1997 | Beshara |
| 5,669,519 A | 9/1997 | Notz et al. |
| 5,746,372 A | 5/1998 | Spence |
| 5,769,256 A | 6/1998 | Medal |
| 5,794,843 A | 8/1998 | Sanchez |
| 5,988,418 A | 11/1999 | Maeshima |
| 6,003,703 A | 12/1999 | Ruggeri et al. |
| 6,019,241 A | 2/2000 | Burns |
| 6,116,503 A | 9/2000 | Varano |
| 6,250,545 B1 | 6/2001 | Mazzarolo et al. |
| 6,286,798 B1 | 9/2001 | Chun |
| 6,460,715 B1 | 10/2002 | Yonemori et al. |
| 6,494,341 B2 | 12/2002 | Perkins et al. |
| 7,431,169 B2 | 10/2008 | Ishikawa et al. |
| D611,772 S | 3/2010 | Silverstein et al. |
| 7,805,886 B2 | 10/2010 | Brandstatter |
| 8,006,862 B2 | 8/2011 | Leslie |
| D647,762 S | 11/2011 | Flaherty |
| 8,056,757 B2 | 11/2011 | Mansour et al. |
| 8,364,542 B2 | 1/2013 | Grauel et al. |
| D679,554 S | 4/2013 | Molz |
| 2006/0043097 A1 | 3/2006 | Tulp |
| 2006/0144915 A1 | 7/2006 | Sadlier |
| 2009/0114661 A1 | 5/2009 | Lim |
| 2010/0072268 A1 | 3/2010 | Johnson et al. |
| 2010/0147937 A1 | 6/2010 | Reid et al. |
| 2010/0200647 A1 | 8/2010 | Tedford et al. |
| 2011/0168729 A1 | 7/2011 | Koenig et al. |
| 2012/0285973 A1 | 11/2012 | Hargett |

CUP HOLDER WITH MORE AND LESS FLEXIBLE PORTIONS AND RECESSED MOVABLE HANDLE

CROSS-REFERENCE TO RELATED APPLICATIONS

The present disclosure is related to and claims all benefit pursuant to 35 U.S.C. §119 of U.S. Provisional Application Ser. No. 61/876,890, filed Sep. 12, 2013, which is incorporated by reference in its entirety.

BACKGROUND

This invention relates to cup holders used to receive cups containing beverages, particularly hot beverages such as tea or coffee, and particularly to such cup holders as include handles that are movable between recesses in the sidewall of the cup holder and an extended position protruding beyond the sidewall of the cup holder, and are adaptable to cups of varying sizes and shapes.

Beverages, such as coffee and tea are often sold in cups that are generally disposable and are typically generally conical in shape. Often the disposable drinking cups lack insulating structures that maintain a temperature of the beverage and/or that protect a consumer's hand from hot temperatures or cold temperatures that may be present around a wall of the cup. Further, the disposable drinking cups often lack handles that might assist a consumer in drinking the beverage and which might prevent exposure of a hand of the consumer to the hot temperatures or cold temperatures that may be present around the wall of the cup.

It is known to attach a handle to a cup to assist a consumer in drinking a beverage. It is also known to insert the cup into a cup-shaped insulating sleeve to retard heat transfer to or from the beverage in the cup. The sleeve is typically non-rigid and provides insignificant support to the cup.

SUMMARY

A re-usable cup holder for a disposable beverage cup can provide a handle, which can be moved between a closed position adjacent the wall of the beverage cup and a deployed position to facilitate handling of the cup. The re-usable holder may be adjustable to fit cups of varying sizes and shapes. The re-usable holder may retard heat transfer to or from a beverage in the cup.

In an embodiment, a cup holder can have a sidewall including a recess. The recesses can be defined in part by an upper flange and a lower flange. The flanges can extend outwardly from the sidewall outer surface and can include at least one socket. A handle can be received wholly within the recess. The handle can include an upper and a lower socket engaging portion received in one of the sockets in the upper and lower flanges. The socket engaging portions can be pivotable within the sockets so as to permit the handle to be displaced from within the sidewall recess to a position projecting outward from the sidewall sufficiently to permit the handle to be grasped in one's hand. The sidewall can additionally include at least one elastomeric segment, which is more flexible than the remainder of the sidewall, extending continuously through the sidewall from the inner surface to the outer surface and extending continuously from the upper margin to the lower margin. The elastomeric segment can be sufficiently flexible to allow the sidewall to adjust to receive cups of varying sizes and shapes.

In an embodiment, a cup holder can have a sidewall including a spaced pair of recesses. Each of the recesses can be defined in part by an upper flange and a lower flange. The flanges can extend outwardly from the sidewall outer surface and can include at least one socket. A handle can be received wholly within each recess. Each handle can include an upper and a lower socket engaging portion received in one of the sockets in the upper and lower flanges. The socket engaging portions can be pivotable within the sockets so as to permit the handles to be displaced from within the sidewall recesses to a position projecting outward from the sidewall sufficiently to permit the pair of handles to be grasped in one hand. The sidewall can additionally include at least two elastomeric segments, which are more flexible than the remainder of the sidewall, extending continuously through the sidewall from the inner surface to the outer surface and extending continuously from the upper margin to the lower margin. The elastomeric segments can be sufficiently flexible to allow the sidewall to adjust to receive cups of varying sizes and shapes.

In an embodiment, at least one of the elastomeric segments can be situated intermediate of the handle receiving recesses, and a second of the elastomeric segments can be situated diametrically opposite thereof. Additional elastomeric segments can be situated in the portions of the sidewall not occupied by the handle receiving recesses. The at least one elastomeric segment can be in the form of an undulating wall portion. The undulating wall portion can have a thickness that is less that the remaining portion of the sidewall so that the undulating wall portion is more flexible than the remaining portion of the sidewall.

In an embodiment, the handles can be molded separately from the sidewall, and can be assembled by vertically displacing the socket engaging potions of a handle toward each other by a distance sufficient to permit the socket engaging elements to snap into the sockets in the outward projecting flanges.

In an embodiment, any of the segments that are not elastomeric can include an interlocking structure to enhance the bonding characteristics with the adjacent elastomeric segment.

Other features of the present disclosure and the corresponding advantages of those features will become apparent from the following discussion of preferred embodiments, which are illustrated in the accompanying drawings. The components in the figures are not necessarily to scale, emphasis instead being placed upon illustrating the principles of the invention. Moreover, in the figures, like referenced numerals designate corresponding parts throughout the different views.

DESCRIPTION OF PREFERRED EMBODIMENTS

Figure 1:
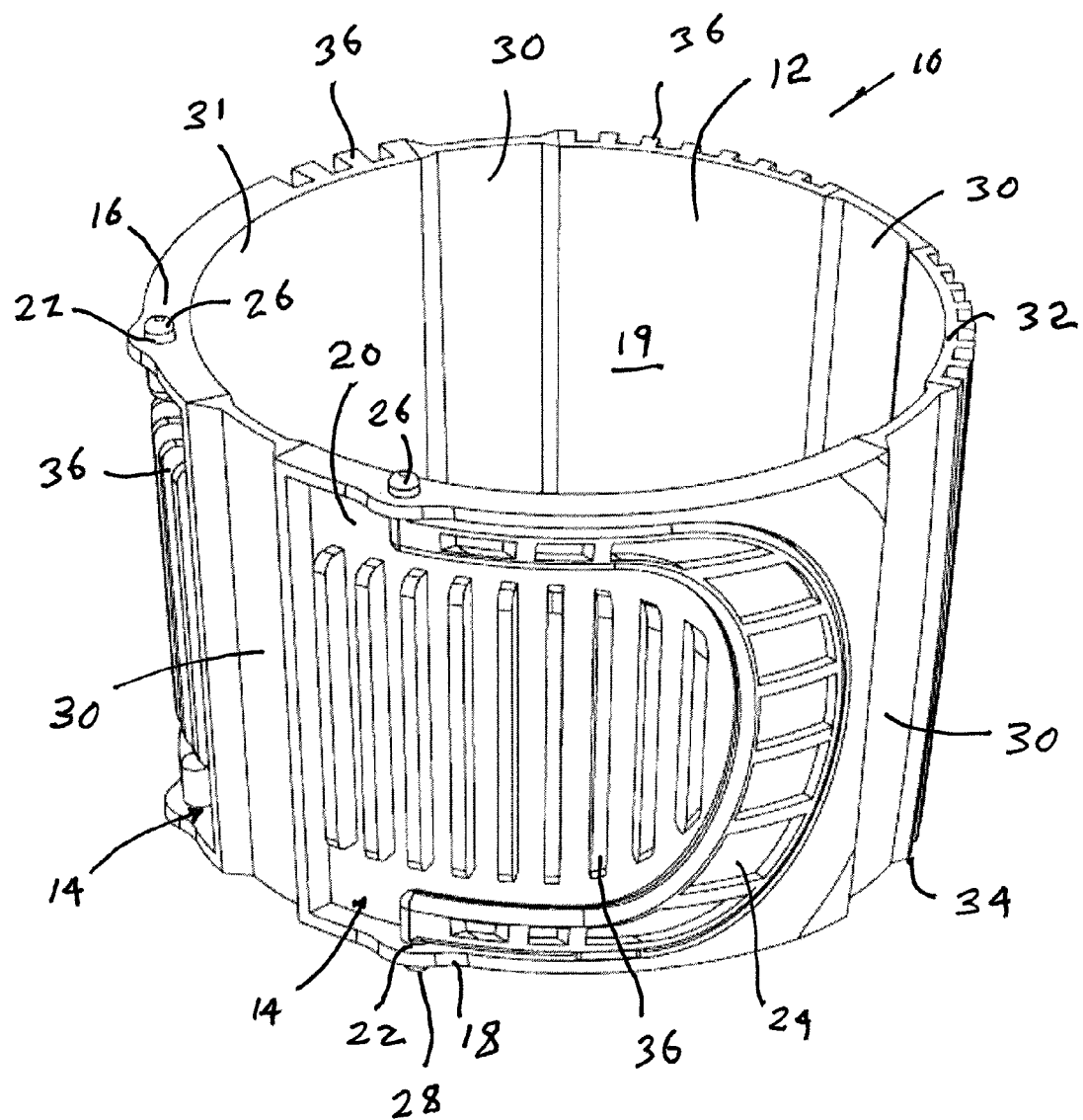
FIG. 1 is a perspective view of an embodiment of a first cup holder.
Figure 4:
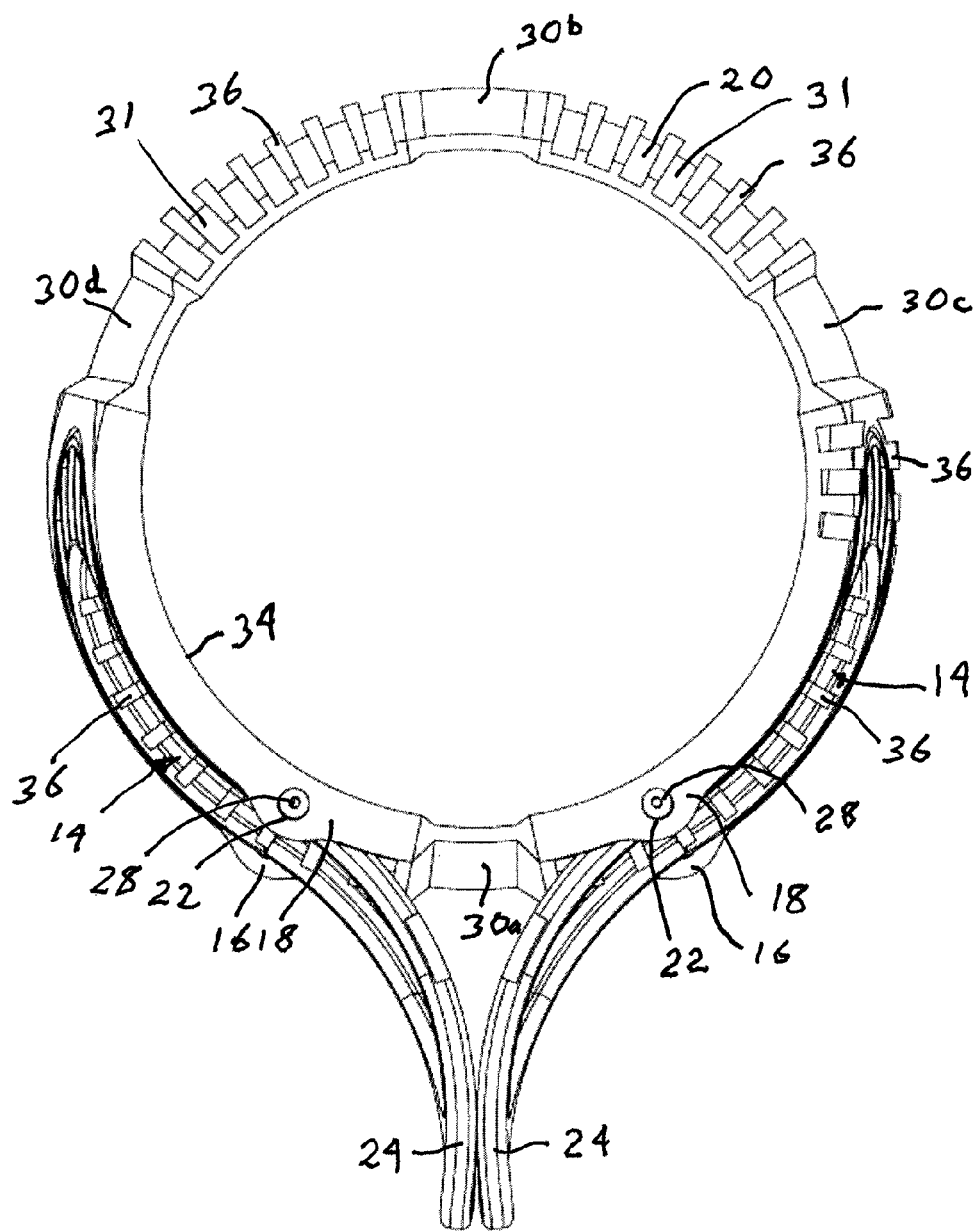
FIG. 4 is a bottom plan view of an example of the cup holder shown in FIG. 1 with the handles shown in an extended position.

An embodiment of a cup holder 10 is shown in FIG. 1 to have a sidewall 12 including recesses 14. Each of the recesses 14 are shown to be defined in part by an upper flange 16 and a lower flange 18. The flanges 16, 18 are shown to extend outwardly from an outer surface 20 of the sidewall 12. The flanges 16, 18 are also shown to include at least one socket 22. A handle 24 is shown to be received wholly within each recess 14. Each handle 24 is shown to include an upper pintle 26 and a lower pintle 28 that constitute socket engaging portions that are respectively received in the sockets 22 in the upper and lower flanges 16, 18. The socket engaging portions can be pivotable within the sockets 22 so as to permit the handle 24 to be displaced from within the sidewall recess 14 to a position projecting outward from the sidewall sufficiently to permit the pair of handle elements to be grasped in one hand as shown in FIG. 4.

The sidewall 12 can additionally include at least two elastomeric segments 30 that are shown to extend continuously through the sidewall 12 from the inner surface 19 to the outer surface 20 and to extend continuously from the upper margin 32 to the lower margin 34 of the sidewall 12. The elastomeric segments 30 can be sufficiently flexible to allow the sidewall 12 to adjust to receive cups of varying sizes and shapes. The elastomeric segments 30 can be formed of a thermoplastic that is flexible or soft in nature such as a flexible vinyl, TPU (polyurethane), EVA, TPE/TPO, or similar elastomers. The non-elastomeric rigid segments 31 of the sidewall 12 can be formed of any rigid polymer that is compatible with the selected elastomer so that the sidewall 12 can be molded using, for example, an insert molding technique where the two selected polymers securely bond to each other.

The elastomeric segments 30 may be positioned in a variety of positions on the sidewall 12. In the embodiment shown in FIG. 1, a group of three elastomeric segments 30 are arranged on a first portion of the sidewall 12. Another elastomeric segment 30 is positioned between two recesses 14 on a second portion of the sidewall 12 opposite from the first portion. Such an arrangement may be advantageous to allow the first portion of sidewall to expand more than the second portion of the sidewall, so that the handles 24 to remain in proximity to one another. In the embodiment shown, the sidewall of the cup holder 10 comprises four elastomeric segments 30 and four rigid segments 31. The recesses 14 are each formed into one of the rigid segments In the embodiment shown in FIG. 1, an elastomeric segment 30 is positioned between two recesses 14, so that the handles 24 may be displaced from the recesses 14 and rotated towards the elastomeric segment 30. It may be desirable that the handles 24 within those recesses 14 have a wide range of motion which allows the handles 24 to rotate and contact each other, even when the elastomeric segment 30 between them has expanded.

Figure 2:
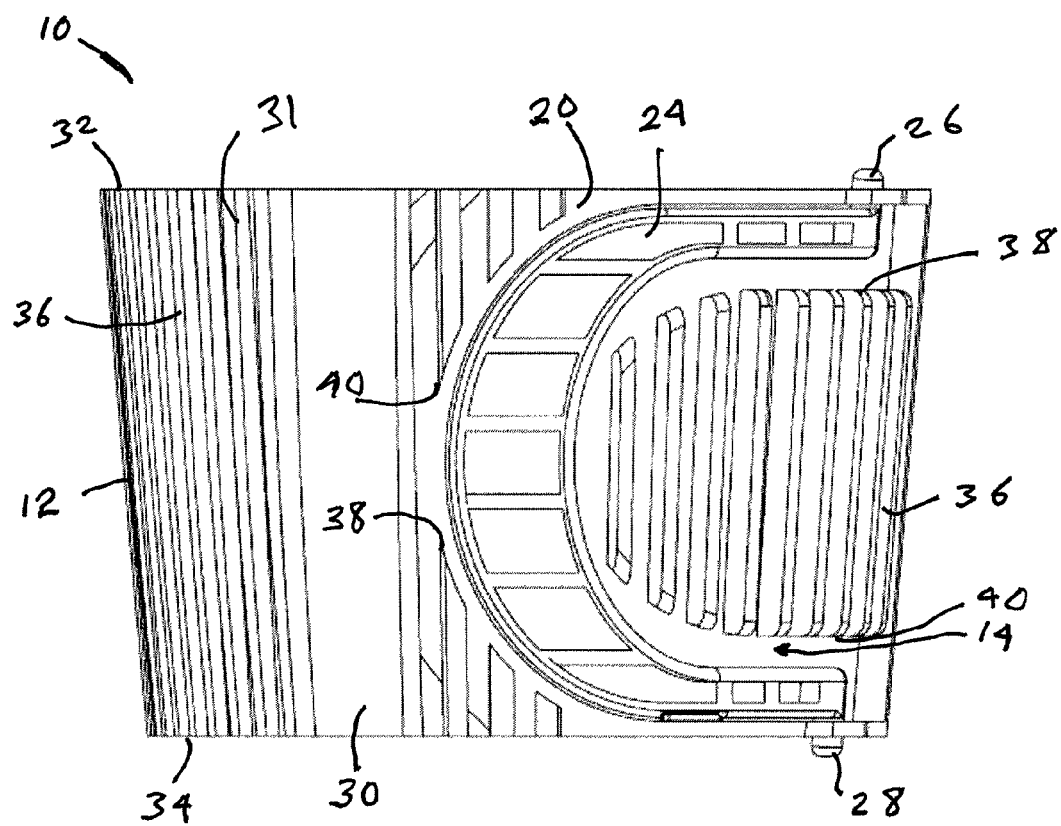
FIG. 2 is a side elevation view of an example of the cup holder shown in FIG. 1.

A side elevation view of an example of a cup holder 10 of the present design is shown in FIG. 2. The sidewall 12 is shown to be of substantially uniform height extending from the lower margin 34 to the upper margin 32. A pattern of vertical ribs 36 is provided on the external surface 20 of the non-elastomeric segments 31. The ribs 36 can extend continuously between the upper margin 32 and the lower margin 34. Alternatively, the ribs 36 can have upper ends 38 and/or lower ends 40 that are not located at either the upper margin 32 or the lower margin 34. The pattern of upper ends 38 and lower ends 40 can help define, for example, the recesses 14 that receive the handles 24. The handle 24 is shown to have a "horse shoe" shape with the pintles 26 and 28 being located at the outside edges of the two tips of the horse shoe shape. Other shapes can be adopted for the handles 24 so long as the recesses 14 are also reconfigured accordingly.

The handles 24 may also include ribs facing outward from the sidewall 12 when the handles 24 are within the recesses 14. The ribs may be arranged vertically, horizontally, or in a diagonal direction. When facing outward from the sidewall 12, the handle ribs may be desirable to make the cup holder 10 easier to grip without displacing the handles 24 from the recesses 14. Alternatively, if the ribs are facing inward, toward the sidewall 12 when the handles 24 are within the recesses 14, the ribs may make the cup holder 10 easier to grip when the handles 24 are displaced from the recesses 14.

Figure 3:
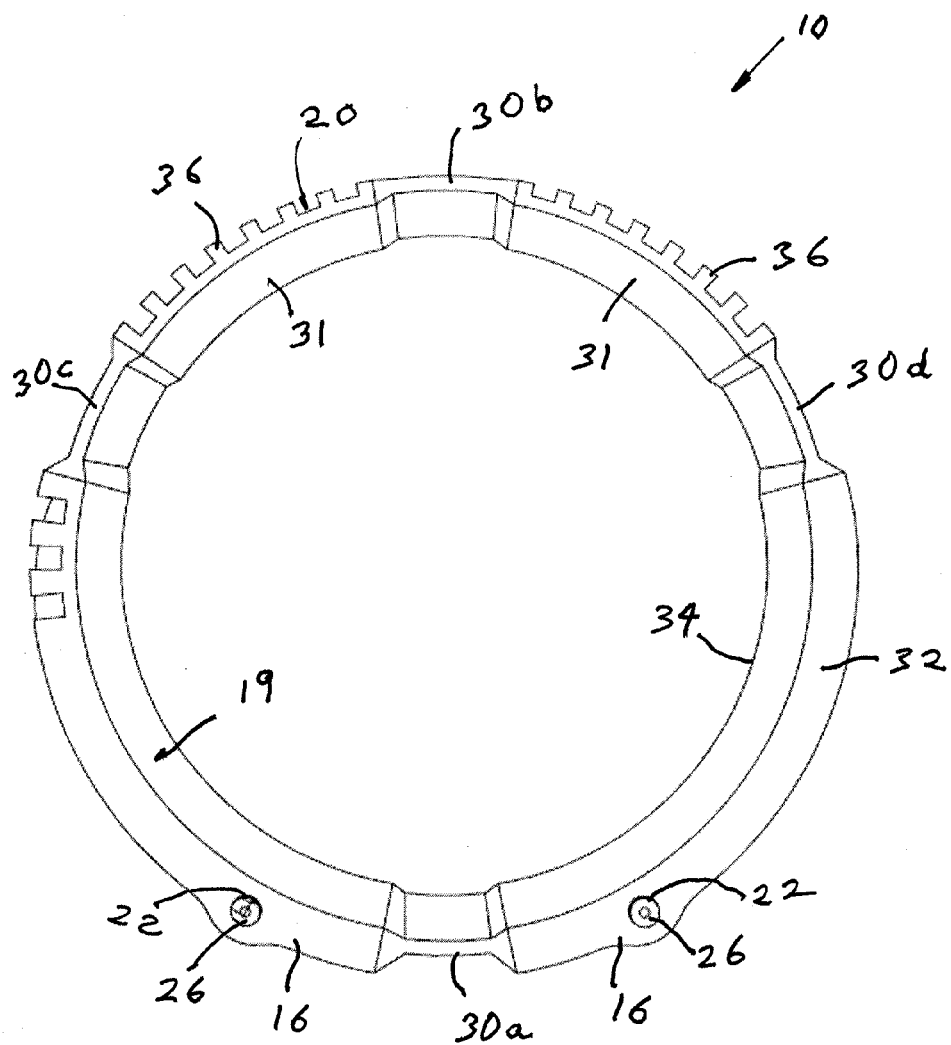
FIG. 3 is a top plan view of an example of the cup holder shown in FIG. 1.

FIG. 3 shows a top plan view of an example of a cup holder 10 of the present design. It will be noted that the circumference of the lower margin 34 is shown to be somewhat smaller than the circumference of the upper margin 32 so that the inner surface 19 is entirely visible in this view. From this one will recognize that the inner surface 19 is tapered from the larger upper margin 32 to the smaller lower margin 34. One will also recognize that the inner surface 19 is essentially smooth, while the outer surface 20 of the non-elastomeric rigid segments 31 can include vertical ribs 36. While no vertical ribs are shown on the inner surface 19, such ribs could be added, if desired. FIG. 3 also shows the presence of the upper flanges 16, each upper flange 16 containing the socket 22 in which the upper pintle 26 is received. FIG. 3 also shows that two of the two elastomeric segments 30a and 30b are located diametrically opposite each other, while the other two elastomeric segments 30c and 30d are situated in a more chordal relationship relative to the center of the cup holder 10.

FIG. 3 also shows that the inner surface 19 of the sidewall 12 defines an opening wherein a cup may be inserted. The opening may be substantially circular or oval in shape and have a diameter which may be increased or decreased. In general, the diameter of the opening is adjustable in accordance with the elasticity of the elastic segments 30. The cup holder 10, sidewall 12, and opening may have a resting size, at which little or no outward force is exerted on the sidewall 12. When a cup is inserted which has a larger diameter than the opening of the sidewall 12, the elastic segments 30 of the cup holder may be expanded to increase the size of the opening and adequately receive the cup. The outward force on the sidewall 12 necessary to expand the elastic segments 30 may be exerted by the cup being inserted into the cup into the opening, or by some other outward force acting on the sidewall 12. Despite expansion of the elastic segments 30, the rigid segments 31 will remain substantially unexpanded, so as to give the sidewall 12 a substantially stable structure.

The opening of the sidewall 12 may also have an upper diameter which corresponds to the diameter at or near the upper margin 32 of the cup holder 10 and a lower diameter which corresponds to the diameter at or near the lower margin 34. It may be desirable that the upper diameter of the opening is different than the lower diameter of the opening. For example, if the cup to be received is a partial conical section, the sidewall 12 of the cup holder will hold the cup by having an opening with a lower diameter which is smaller than an upper diameter. In this way, the wall of the cup will rest against the sidewall 12 of the cup holder 10.

The lower and upper diameters of the opening may also be independently adjusted so that the sidewall 12 of the cup holder 10 closely conforms to the shape of the cup. It may be desirable that when receiving the cup, the lower diameter of the opening increases more than the upper opening. In this case, the sidewall 12 may conform to the shape of the cup, so that the portion of the elastic segment 30 in proximity to the lower margin 34 expands more than the portion of the elastic segment 30 in proximity to the upper margin 32. The reciprocal case may also be possible.

FIG. 4 is a bottom plan view of an example of a cup holder 10 of the present design shown with the handles 24 in an extended position so that the pair of handles 24 can be grasped in one hand. The handled 24 are moved to the illustrated position by rotating the handles out of recesses 14, the rotation being permitted by virtue of the pivotal relation between pintles 28 being received in sockets 22 in the lower flange 18, and the corresponding relationship shown in FIG. 3 relative to the upper flange 16. The outer surface 20 of the non-elastomeric segments 31 is again seen to include a plurality of ribs 36. FIG. 4 also shows that two of the two elastomeric segments 30a and 30b are located diametrically opposite each other, while the other two elastomeric segments 30c and 30d are situated in a more chordal relationship relative to the center of the cup holder 10.

FIG. 4 also shows that the handles 24 may have a curvature which matches the shape of the sidewall 12 where the recesses 14 are positioned. In the embodiment shown, the handles 24 are shown wherein each handle has an upper portion having an upper curvature and a lower portion having a different lower curvature. For example, if the sidewall 12 has a shape wherein the diameter of the opening in proximity to the upper margin 32 is larger than the diameter of the opening in proximity to the lower margin 34, then the curvature of the sidewall 12 will vary from the upper margin 32 to the lower margin 34. Accordingly, the upper portion of the handle 24 will have a curvature which more closely resembles the shape of the sidewall 12 in proximity to the upper margin 32, and the lower portion of the handle 24 will have a curvature which more closely resembles the shape of the sidewall in proximity to the lower margin 34.

Figure 5:
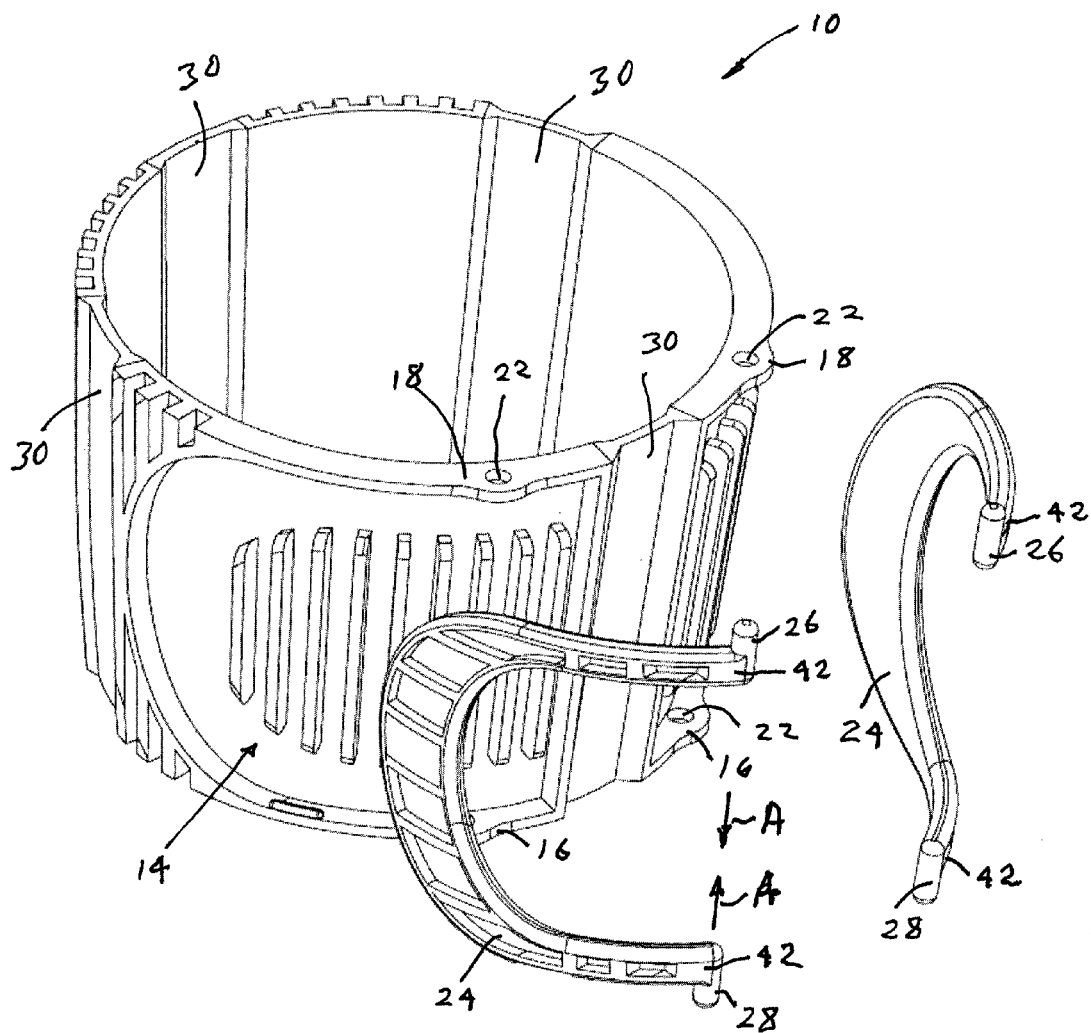
FIG. 5 is a perspective view of an example of the cup holder shown in FIG. 1 with the handles shown exploded from the cup holder.

FIG. 5 is a perspective view of an example of a cup holder 10 of the present design with the handles 24 shown in an exploded position. One will appreciate from this view that the handles 24 can be molded or otherwise formed separately from the remainder of the cup holder 10. Again, the handles 24 are shown to have a "horse shoe" shape with the pintles 26 and 28 being located at the outside edges of the two tips 42 of the horse shoe shape. To assemble the handles 24 to the remainder of the cup holder 10, one of the upper and lower pintles 26, 28 can be inserted into the appropriate socket 22 in either the upper or lower flanges 18, 16. The tips 42 of each handle 24 can be displaced toward each other in the direction of arrows A by application of an outside force, the displacement being sufficient to permit the socket engaging elements 26, 28 to snap into the sockets 22 in the outward projecting flanges 16, 18. The handles 24 can then be entirely received in the recesses 14 to form the more compact form of the cup holder 10.

Figure 6:
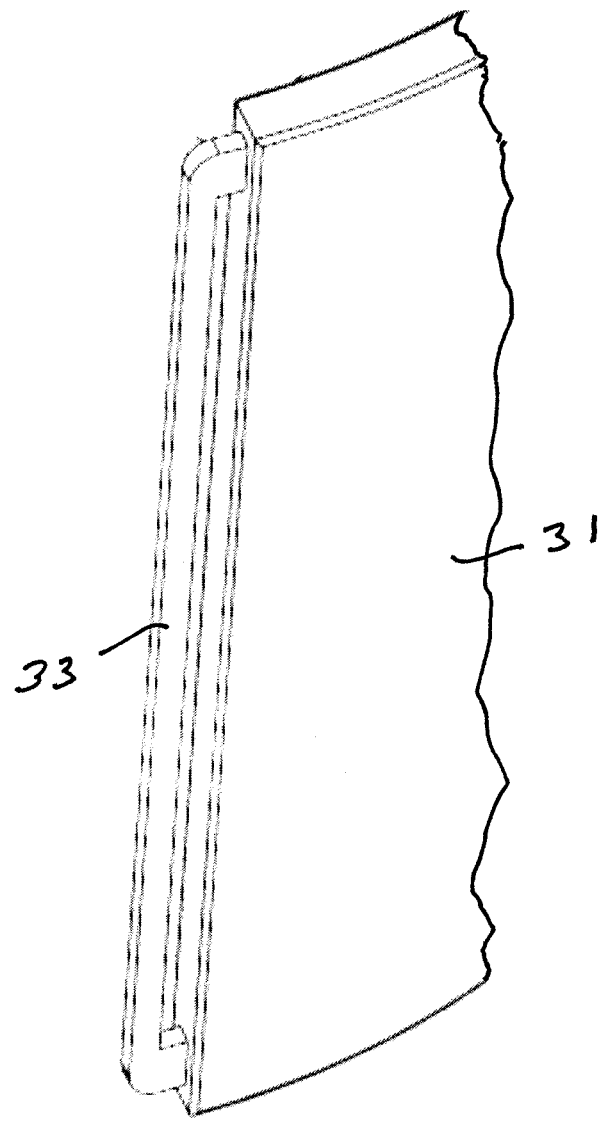
FIG. 6 is a perspective view of an example of a side of a non-elastomeric rigid segment showing a mechanical locking portion prior to molding.

FIG. 6 shows an example of an end of a non-elastomeric rigid segment 31. The non-elastomeric segment 31 can include a mechanical locking portion 33 to enhance the bond between the non-elastomeric rigid segment 31 and the adjacently molded elastomeric segment 30. The shape of the mechanical locking portion 33 is subject to design selection. The presence of a mechanical locking portion 33 may not be desirable or necessary depending on the bonding strength of the polymers selected for the adjacent segments 30 and 31. While the cup holder 10 has been illustrated in FIGS. 1-5 as having four elastomeric segments 30, the number of segments is a matter of a choice of design.

The mechanical locking portion 33 of the rigid segment 31 may be coupled to the elastic segment 30 in a variety of ways. In the embodiment shown, the mechanical locking portion 33 comprises an elongated member which projects outward from the rigid segment 31 in the direction of the sidewall 12. The mechanical locking member 33 is coupled to the sidewall 12 by an upper connecting member which is in proximity to the upper margin 32 and a lower connecting member which is in proximity to the lower margin 34. The elongated member, the upper and lower connecting members, and the rigid segment 31 define a slot between the elongated member and the rigid segment 30 which is adapted to receive a portion of the elastic segment 30. The mechanical locking portion 33 may have a thickness which is less than both the rigid segments 31 and the elastic segments 31 so that the mechanical locking portion 33 may be completely or partially embedded within the elastic segment 30.

Alternatively, the mechanical locking portion 33 may project outwardly from the inner surface 19 or the outer surface 20 of the sidewall 12. In such an embodiment, the elastic segment 30 may overlap with the rigid segment 31 to couple to the mechanical locking portion 33.

Figure 7:
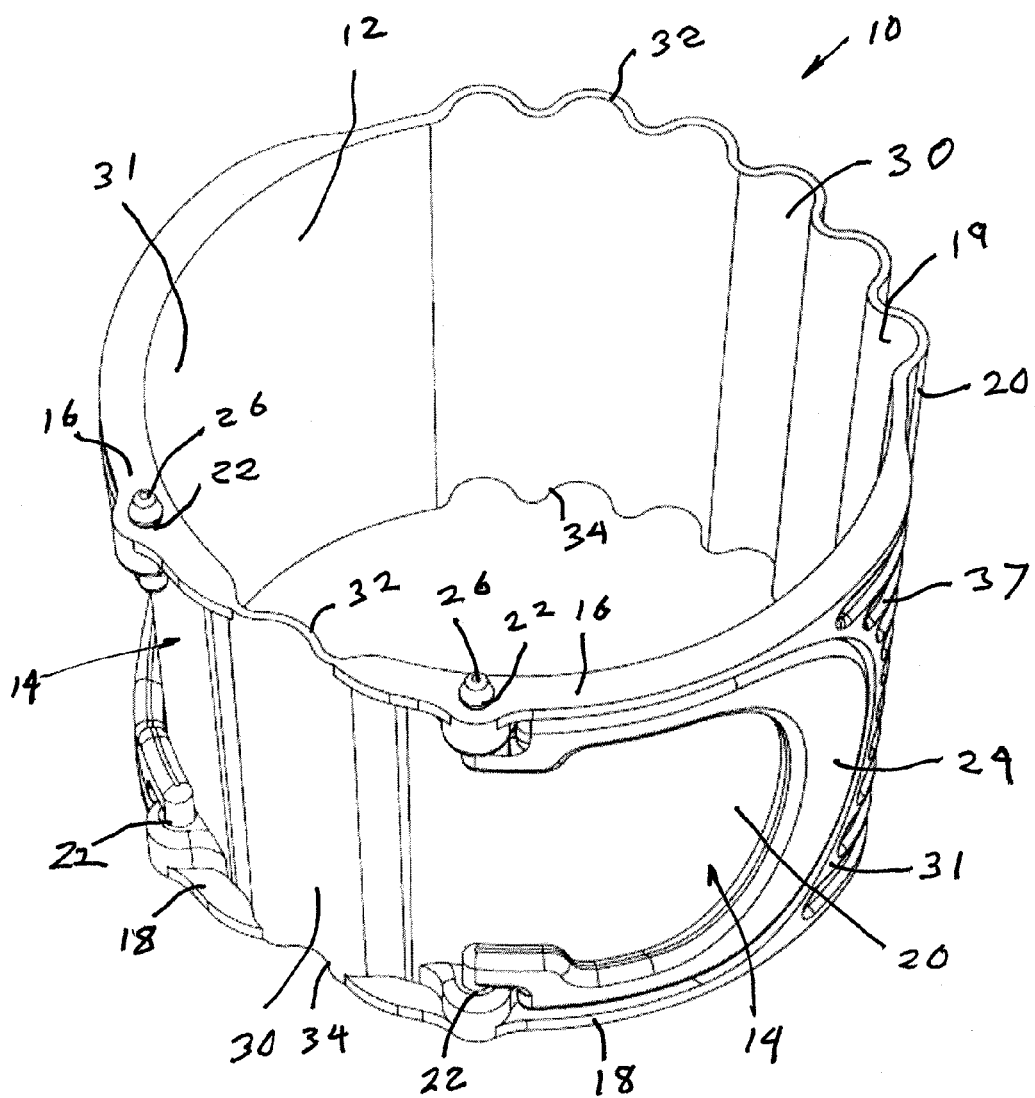
FIG. 7 is a perspective view of an example of a second embodiment of a cup holder.

Another example of a cup holder 10 is shown in FIG. 7 to have a sidewall 12 including recesses 14. Each of the recesses 14 are shown to be defined in part by an upper flange 16 and a lower flange 18. The flanges 16, 18 are shown to extend outwardly from an outer surface 20 of segments 31 of the sidewall 12. The flanges 16, 18 are also shown to include at least one socket 22. A handle 24 is shown to be received wholly within each recess 14. Each handle 24 is shown to include an upper pintle 26 and a lower pintle that constitute socket engaging portions that are respectively received in the sockets 22 in the upper and lower flanges 16, 18. The socket engaging portions can be pivotable within the sockets 22 so as to permit the handle 24 to be displaced from within the sidewall recess 14 to a position projecting outward from the sidewall sufficiently to permit the pair of handles 24 to be grasped in one hand as shown in the example of FIG. 8.

The sidewall 12 can additionally include segments 30 that can be thinner than segments 31. The segments 30 are shown to extend continuously through the sidewall 12 from the inner surface 19 to the outer surface 20 and to extend continuously from the upper margin 32 to the lower margin 34 of the sidewall 12. The segments 30 are generally more flexible than segments 31 and can be sufficiently flexible to allow the sidewall 12 to adjust to receive cups of varying sizes and shapes. The segments 30 and 31 can be formed, for example, of a thermoplastic that is flexible or soft in nature such as a flexible vinyl, TPU (polyurethane), EVA, TPE/TPO, or similar elastomers, and the flexible character of each segment controlled by the thickness of the particular segment. The less flexible segments 31 of sidewall 12 can include horizontal ribs 37 to provide enhanced strength for the cup holder 10.

One of the elastic segments 30 shown in FIG. 7 comprises a plurality of preformed folds arranged on a first portion of the sidewall 12 opposite from a second portion of the sidewall 12 comprising the recesses 14. Another elastic segment comprises a single fold positioned on the second portion of the sidewall 12 between the two recesses 14. The preformed folds are expandable or unfoldable according to the elasticity of the elastic segment 30. When no outward force is applied to the sidewall 12, the folds rest in a folded or partially folded position. The diameter of the opening defined by the sidewall 12 which may be increased by expansion or unfolding of the preformed folds.

Figure 8:
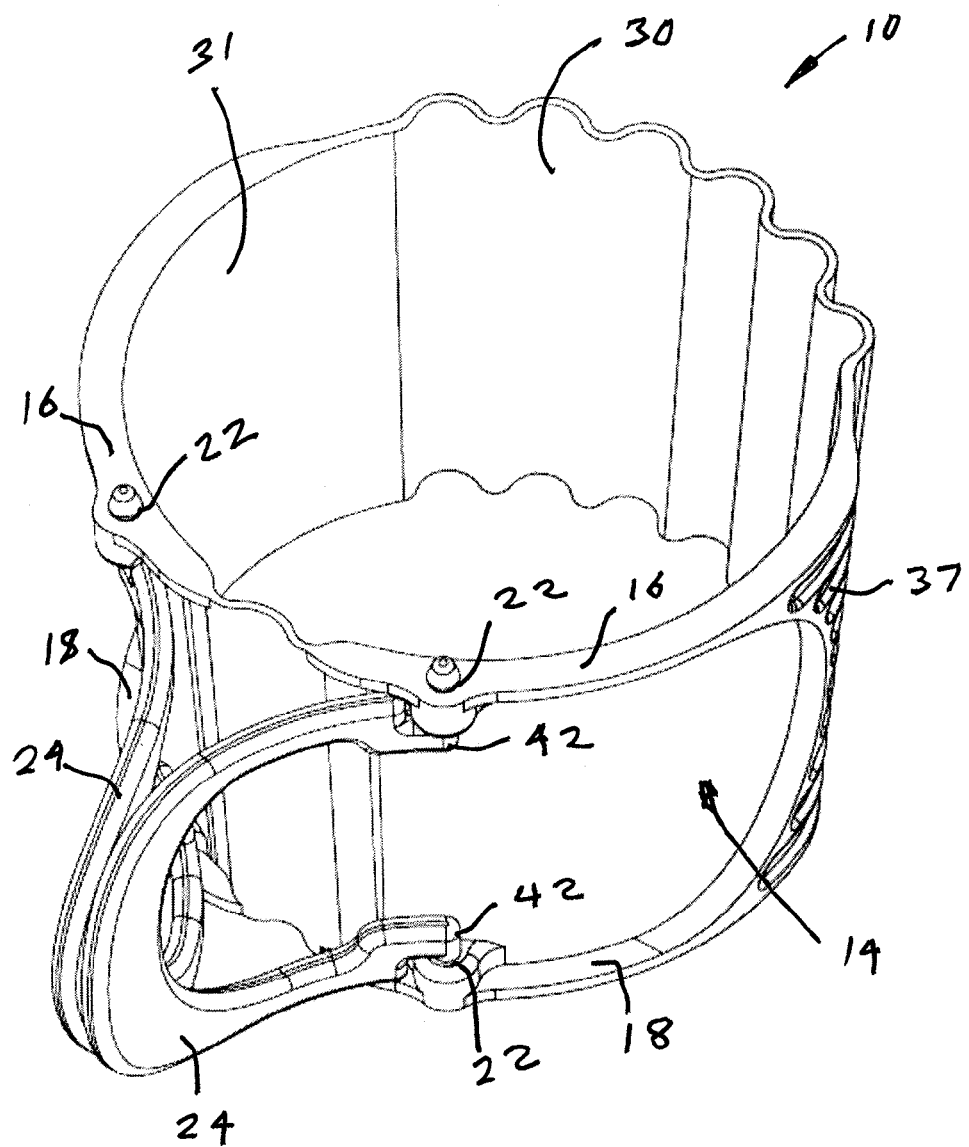
FIG. 8 is a perspective view of an example of the cup holder shown in FIG. 7 with the handles shown in an extended position.

FIG. 8 is a perspective view of the cup holder 10 of the design shown in FIG. 7 with the handles 24 shown in an extended position. The handles 24 can be molded or otherwise formed separately from the remainder of the cup holder 10. Again, the handles 24 are shown to have a "horse shoe" shape with the pintles being located at the outside edges of the two tips 42 of the horse shoe shape. To assemble the handles 24 to the remainder of the cup holder 10, one of the upper and lower pintles can be inserted into the appropriate socket 22 in either the upper or lower flanges 18, 16. The tips 42 of each handle 24 can be displaced toward each other as shown in FIG. 5 by application of an outside force, the displacement being sufficient to permit the socket engaging elements to snap into the sockets 22 in the outward projecting flanges 16, 18. The handles 24 can then be entirely received in the recesses 14 to form the more compact form of the cup holder 10 as shown in FIG. 8.

While these features have been disclosed in connection with the illustrated preferred embodiments, other embodiments of the invention that come within the spirit of the invention as defined in the following claims will be apparent to those skilled in the art.

The invention claimed is:

1. A cup holder comprising:
   a sidewall having an upper margin, a lower margin, an inner surface, and an outer surface, the outer surface of the sidewall including at least one recess, each recess being defined by an upper flange and a lower flange, the upper and lower flanges extending outwardly from the sidewall outer surface and the upper and lower flanges including at least one socket;
   at least one handle element adapted to be received at least partially within the at least one recess in the sidewall, each handle element including an upper and a lower socket engaging portion received in one of the at least one sockets the upper and lower flanges of one of the at least one recess, the socket engaging portions being pivotable within the sockets so as to permit the at least one handle element to be displaced from the at least one recess to a position projecting outward from the sidewall; and
   wherein the sidewall additionally includes at least one elastic segment that is more flexible than other sidewall rigid segments, the at least one elastic segment extending through the sidewall from the inner surface to the outer surface and extending from the upper margin to the lower margin, the at least one elastic segment being flexible to allow the sidewall to adjust to receive cups of varying sizes and shapes.

2. A cup holder comprising:
   a sidewall;
   a pair of handle elements adapted to be received at least partially within a pair of recesses in the sidewall, each of the handle elements including an upper socket engaging portion and a lower socket engaging portion, each received in one of a plurality of sockets;
   wherein the sidewall includes an upper margin, a lower margin, an inner surface, an outer surface, and at least two elastomeric segments extending through the sidewall from the inner surface to the outer surface and extending from the upper margin to the lower margin, the outer surface of the sidewall including the pair of recesses, each recess being defined by an upper flange and a lower flange, the elastomeric segments of the sidewall being flexible to allow the sidewall to adjust to receive cups of varying sizes and shapes; and
   wherein the upper flanges and the lower flanges extend outwardly from the sidewall outer surface and include the plurality of sockets, the socket engaging portions being pivotable within the sockets so as to permit the handle elements to be displaced from the pair of recesses to a position projecting outward from the sidewall.

3. The cup holder of claim 1, wherein the sidewall comprises at least two elastic segments, and wherein the at least two elastic segments are diametrically opposed from each other.

4. The cup holder of claim 3, wherein the sidewall comprises at least two recesses, and wherein at least one of the two elastic segments are positioned on the sidewall between the at least two recesses.

5. The cup holder of claim 1, wherein the sidewall comprises at least two recesses, and wherein at least two elastic segments are on a first portion of the sidewall and the at least two recesses are on a second portion of the sidewall opposed to the first portion.

6. The cup holder of claim 2, wherein the inner surface of the sidewall defines an opening having an adjustable diameter in accordance with the elasticity of the at least two elastomeric segments.

7. The cup holder of claim 6, wherein the at least one elastic segment comprises a plurality of preformed folds expandable to increase the diameter of the opening.

8. The cup holder of claim 7, wherein the preformed folds are on a first portion of the sidewall and the pair of recesses are on a second portion of the side of the sidewall opposed to the first portion.

9. The cup holder of claim 1, wherein the rigid segments of the sidewall each comprise at least one mechanical locking portion which is coupled to at least one of the at least one elastic segments.

10. The cup holder of claim 9, wherein at least a portion of the at least one mechanical locking portion which is embedded within at least one of the at least one elastic segments.

11. The cup holder of claim 9, wherein the at least one mechanical locking portion has a thickness less than the rigid segments of the sidewall.

12. The cup holder of claim 9, wherein the at least one mechanical locking portion comprises a slot adapted to receive a portion of the at least one of elastic segments.

13. The cup holder of claim 1, wherein the rigid segments of the sidewall comprise a plurality of ribs protruding from the outer surface.

14. The cup holder of claim 13, wherein the plurality of ribs are arranged substantially horizontally.

15. The cup holder of claim 13, wherein the plurality of ribs are arranged substantially vertically.

16. The cup holder of claim 15, wherein the ribs extend between the upper margin and the lower margin.

17. The cup holder of claim 15, wherein each of the plurality of ribs include an upper end and a lower end which define a portion of the at least one recess.

18. A cup holder comprising:
   a sidewall comprising an inner surface, an outer surface, an elastomeric segment and a rigid segment, the outer surface of the sidewall including a recess defined by an upper flange and a lower flange, the upper and lower flanges extending outwardly from the sidewall outer surface and the upper and lower flanges including at least one socket, wherein the inner surface of the sidewall defines an opening which may be adjusted in accordance with an elasticity of the elastomeric segment of the sidewall; and a handle element adapted to be at least partially received within the recess of the sidewall, the handle element including a socket engaging portion received within the socket so as to permit the at least one handle element to be displaced from the recess to a position projection outward from the sidewall.

19. The cup holder of claim 18, wherein the sidewall comprises at least four elastomeric segments.

20. The cup holder of claim 19, wherein the sidewall comprises a first portion comprising at least two recesses with at least one of the elastomeric segments positioned on the sidewall between the at least two recesses, and a second portion, opposed to the first portion, comprising at least three of the elastomeric segments.

* * * * *